(12) United States Patent
McGee et al.

(10) Patent No.: US 7,631,905 B2
(45) Date of Patent: Dec. 15, 2009

(54) QUICK CONNECT COUPLING

(75) Inventors: Stephen McGee, St. Neots (GB); Jonathan Clark Swift, Cambridge (GB); Randall Mark Leasure, Monument, CO (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 12/079,020

(22) Filed: Mar. 24, 2008

(65) Prior Publication Data

US 2008/0174111 A1   Jul. 24, 2008

Related U.S. Application Data

(63) Continuation of application No. 11/257,138, filed on Oct. 24, 2005, now Pat. No. 7,364,207.

(60) Provisional application No. 60/623,547, filed on Oct. 29, 2004.

(51) Int. Cl.
    *F16L 37/088*   (2006.01)
(52) U.S. Cl. ..................... 285/321; 285/347
(58) Field of Classification Search ............ 285/305, 285/307, 321, 347
    See application file for complete search history.

(56) References Cited

U.S. PATENT DOCUMENTS

| | | | | |
|---|---|---|---|---|
| 2,914,344 A * | 11/1959 | Anthes | ....................... | 285/93 |
| 4,063,760 A * | 12/1977 | Moreiras | ..................... | 285/242 |
| 4,278,276 A * | 7/1981 | Ekman | .......................... | 285/49 |
| 4,475,748 A * | 10/1984 | Ekman | ........................... | 285/3 |
| 4,565,392 A * | 1/1986 | Vyse | ............................. | 285/23 |
| 4,707,000 A * | 11/1987 | Torgardh | ..................... | 285/305 |
| 4,733,890 A * | 3/1988 | Vyse | ..................... | 285/148.14 |
| 4,863,202 A * | 9/1989 | Oldford | ....................... | 285/321 |
| 4,872,710 A * | 10/1989 | Konecny et al. | .............. | 285/81 |
| 4,884,829 A * | 12/1989 | Funk et al. | .................... | 285/24 |
| 4,889,368 A * | 12/1989 | Laipply | ....................... | 285/18 |
| 5,364,131 A * | 11/1994 | Hartsock et al. | .............. | 285/23 |
| 5,845,944 A * | 12/1998 | Enger et al. | ................... | 285/23 |
| 6,095,570 A * | 8/2000 | Hagen et al. | .................. | 285/93 |

(Continued)

FOREIGN PATENT DOCUMENTS

FR    2 484 049    * 12/1981

(Continued)

*Primary Examiner*—James M Hewitt
(74) *Attorney, Agent, or Firm*—J. L. Mahurin, Esq.; J. A. Thurnau, Esq.; P. N. Dunlap, Esq.

(57) ABSTRACT

A quick connect coupling having a clip, a port having an interior annular groove adapted to support the clip, a forward cylinder, a rear cylinder, and a first transition ramp, and defines a port peak distance. The coupling also has a sealing element. Additionally, the coupling also has a stem having a male connection portion including a forward annular seal groove adapted to receive the sealing element, an annular lead-in surface, a leading support cylindrical surface, a following support cylindrical surface, a camming ramp, and defines a stem peak distance. The port has an intermediate cylinder between the forward cylinder and the rear cylinder and has a second transition ramp between the forward cylinder and the intermediate cylinder and the male connection portion has a centering ramp and an intermediate support cylindrical surface between the leading support cylindrical surface and the following support cylindrical surface.

5 Claims, 3 Drawing Sheets

U.S. PATENT DOCUMENTS 6,474,698 B2 * 11/2002 Dobler et al. ............... 285/321
6,604,760 B2 * 8/2003 Cresswell et al. ........... 285/305
6,637,781 B1 * 10/2003 Seymour, II ............... 285/305
6,869,108 B2 * 3/2005 Kwon et al. ................ 285/276
7,014,215 B2 * 3/2006 Cooper et al. .............. 285/247
7,364,207 B2 * 4/2008 McGee et al. ............... 285/321

FOREIGN PATENT DOCUMENTS

WO    WO 9901691 A1 *  1/1999

* cited by examiner

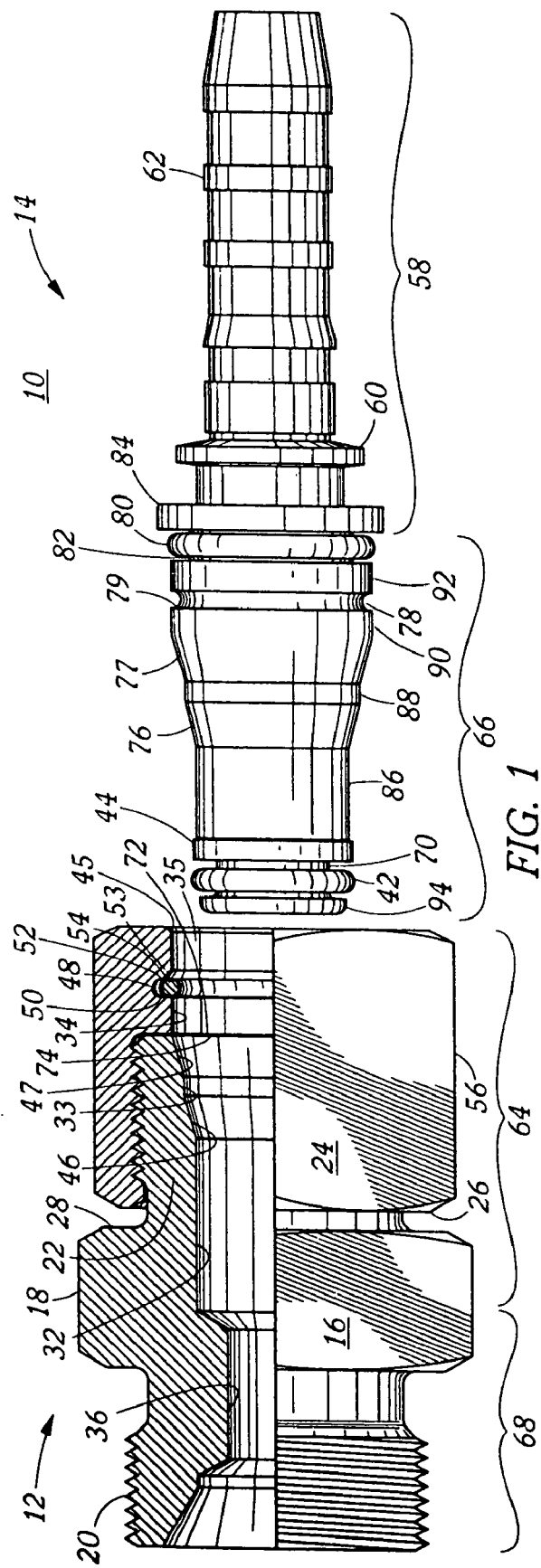
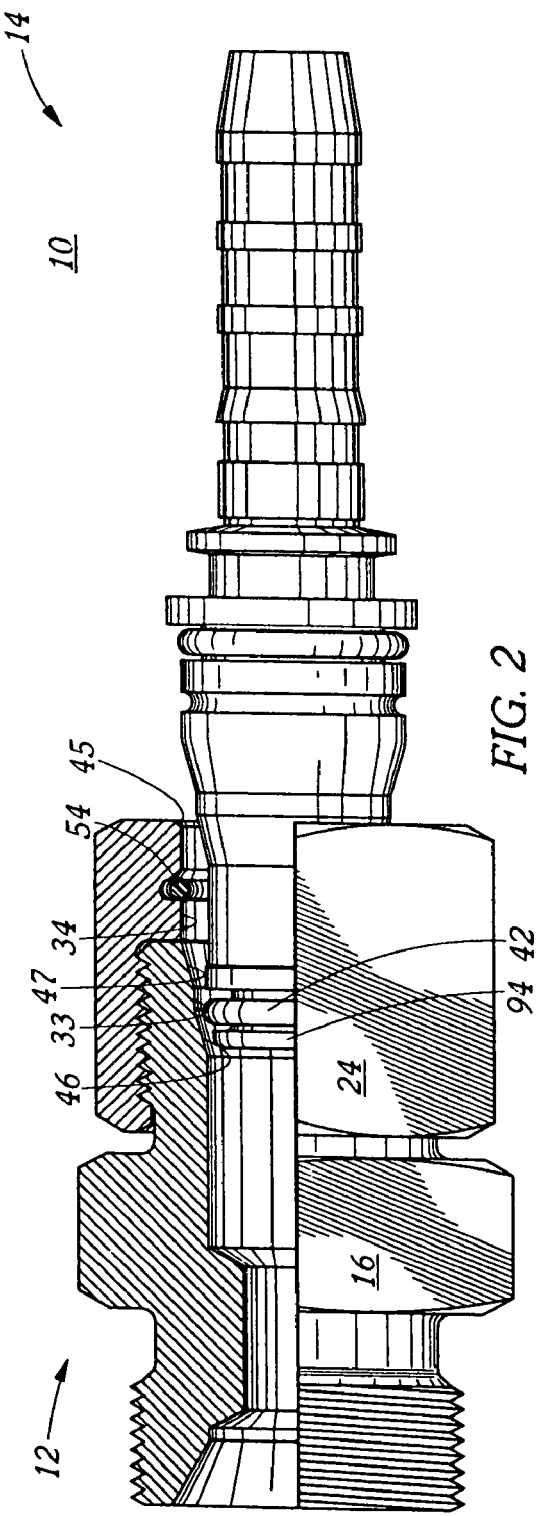
FIG. 1
FIG. 2

QUICK CONNECT COUPLING

CROSS-REFERENCE TO RELATED APPLICATIONS

This is a continuation of U.S. patent application Ser. No. 11/257,138, Filed Oct. 24, 2005 now U.S. Pat. No. 7,364,207, entitled QUICK CONNECT COUPLING, which claims priority to U.S. Provisional Patent Application Ser. No. 60/623,547, filed Oct. 29, 2004, also entitled QUICK CONNECT COUPLING. The subject matter of these applications is incorporated herein by reference.

BACKGROUND OF THE INVENTION

1. Field of the Invention

This invention relates generally to flexible hose couplings. More particularly, it relates to a novel and improved quick connect hose coupling.

2. Description of the Prior Art

Quick connect couplings are known. In such a coupling, a port may be machined directly into an associated fixture, machinery or equipment, or a body assembly or fixture portion may have the port and threads for pre-assembly on an associated fixture, machinery or equipment. The hose connection portion, including a hose stem portion and a ferrule, is attached to an open end of the hose to be connected to the fixture, machinery or equipment. The hose stem portion has a hose insert portion, which is inserted into the open end of the hose. The ferrule is then compressed about the hose end containing the insert causing all portions to be permanently affixed. Merely pressing the hose connection portion into the port subsequently completes the hose connection. Such a quick connect coupling is particularly desirable when the hose must be connected in a location which is not readily accessible, since it eliminates the need for starting the threads and the danger of cross threading. Further, for such a coupling having its port included in a body assembly or fixture portion, it may be threaded into place as a pre-assembly operation making it easy to insure that the body assembly or fixture portion receives proper torque. Further, the time of assembly and assembly costs are reduced.

A quick connect coupling can be provided without a disconnection mechanism, such as where the port is machined directly into the fixture, machine, or equipment without an additional provision for disconnection. However, for a quick connect coupling having its port integral to a body assembly or fixture portion, the disconnection includes unscrewing all or a portion of the body assembly or fixture portion from the machine or fixture to which their respective hose is attached.

Where the body assembly or fixture portion is unitary, the entire body assembly is unscrewed from the machine or fixture. The body assembly or fixture portion can also include intermediate threads making it separable into pieces, usually a draw-down nut portion having the quick connect feature and an adapter having the bore which corresponds to the male connection portion of the hose stem. Upon unthreading the threaded portion, one part of the body assembly remains with the machine or fixture. The other part separates from the first part and remains with the hose connection portion. In either instance, while connection is a quick single stroke process, the disconnection requires a slower unthreading process to provide the opportunity to discover that the fitting is under internal pressure before being completely disconnected. Reconnection is effected, from this point forward, by the inverse of the disconnection process.

Quick connect couplings provide means to seal between the hose stem and the port and to provide a mechanical locking of the hose stem in the port. To achieve maximum benefit from a quick connect coupling, such a coupling must reliably connect under the adverse conditions encountered such as in industrial or heavy machinery locations, where installations of fluid connections are numerous, dense, and almost inaccessible. Characteristics that are important to ensure that a quick connect coupling reliably connect include: 1) the required insertion force of the coupling being low; 2) the required insertion force being consistent among sibling couplings; 3) the coupling being axially self-aligning; 4) the coupling being highly resistive to binding upon misaligned insertion of the stem into the port; 5) the coupling being self guiding to overcome substantial lateral misalignment when the process of connection is first begun; and, 6) the coupling being highly resistive to binding upon misalignment of stem in relation to the clip upon insertion of the stem into the port. Still, the hose stem portion must seat securely upon completion of connection, and should result in a stable and durable connection.

One approach toward obtaining the characteristic of the coupling being highly resistive to binding upon misalignment of stem in relation to the clip upon insertion of the stem into the port is found in U.S. Pat. No. 4,565,392 to Vyse. The issue is described in Vyse '392 as follows: "A problem that has been encountered in making this connection is that, at the time the [stem] is pushed into the socket, the forward end of the [stem] sometimes jams or catches on the snap ring which is mounted in the interior opening of the [port]". The jamming that is being described is where the snap-ring is forced out of the interior opening, or snap-ring groove, and deeper within the port by the stem pressing upon only a small portion of the snap-ring (as opposed to uniformly about the snap-ring), causing it to tilt and thereby clog the port. The clog prevents the stem from being allowed to seat fully within the port to a point of locking into place, or forming an axial locking relationship between the stem and port.

The solution presented by Vyse '392 was to fill the snap-ring groove, in which the snap-ring would reside prior to connection of the coupling, with a viscous fluid such as grease, to maintain a centered position for the snap-ring at all times prior to the insertion of the stem in the port. In this way the snap-ring is not allowed to be pulled from a centered position within the groove by gravity. As long as the ring is centered, the opportunity for the stem to catch the ring and force it to tilt within the port is apparently reduced. However, the solution presented by the Vyse '392 patent has a significant disadvantage and limitation. It is very undesirable to introduce grease to the coupling in the manner described. It requires a manual step in the production of the coupling, adding cost and complexity. More significantly, the grease represents contamination that can interfere with proper functioning of the coupling over its life and acts to hold other contaminants within the coupling, such as particulates that can be very abrasive. While, the grease may be effective at securing the clip against movement by gravity, it does not insure that the clip will not be moved out of proper placement by handling or bumping of the port any time prior to connection. When the clip is moved by handling or bumping, the grease only insures that the clip remains in any position it assumes, whether proper or not.

The use of grease by the Vyse '392 patent does not address the other important characteristics of 1) the required insertion force of the coupling being low; 2) the required insertion force being consistent among sibling couplings; 3) the coupling being axially self-aligning; 4) the coupling being highly resistive to binding upon misaligned insertion of the stem into the port; and, 5) the coupling being self guiding to overcome substantial lateral misalignment when the process of connection is first begun.

Accordingly, there is a continuing need for a hose coupling that achieves all six of these important characteristics.

SUMMARY

The present invention has as an object the provision of a quick connect hose coupling with an improvement in the combination of characteristics leading to a quick connect coupling that will be connected reliably, consistently, and with acceptably low insertion force.

The present invention is an improved quick connect coupling of the type having a clip, a port having an interior annular groove adapted to support the clip, a forward cylinder, a rear cylinder, and a first transition ramp, and defines a port peak distance. The coupling is also of the type having a sealing element. Additionally, the coupling is of the type having a stem having a male connection portion including a forward annular seal groove adapted to receive the sealing element, an annular lead-in surface, a leading support cylindrical surface, a following support cylindrical surface, a camming ramp, and defines a stem peak distance. It is improved by the port having an intermediate cylinder between the forward cylinder and the rear cylinder and having a second transition ramp between the forward cylinder and the intermediate cylinder and by the male connection portion having a centering ramp and an intermediate support cylindrical surface between the leading support cylindrical surface and the following support cylindrical surface.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings:

FIG. 1 is an elevation with one quarter cut-away of a port for a preferred embodiment prior to connection of the coupling;

FIG. 2 is an elevation with one quarter cut-away of a port for a preferred embodiment shortly into connection of the coupling;

DETAILED DESCRIPTION

Figure 3:
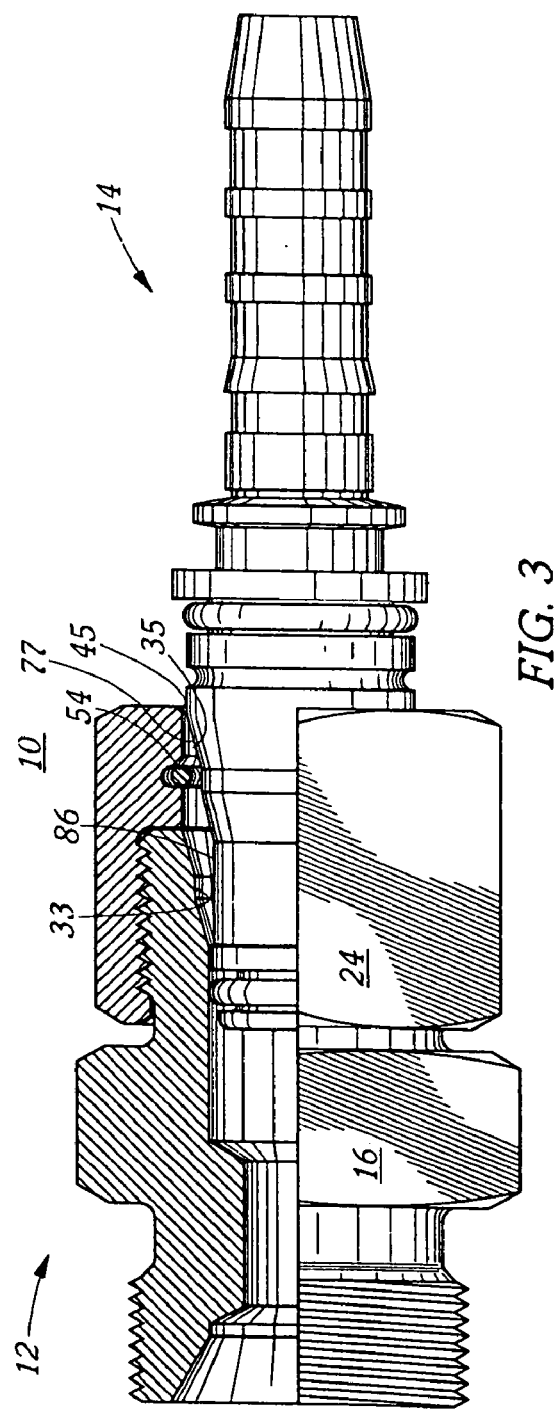
FIG. 3 is an elevation with one quarter cut-away of a port for a preferred embodiment as connection of the coupling progresses.
Figure 4:
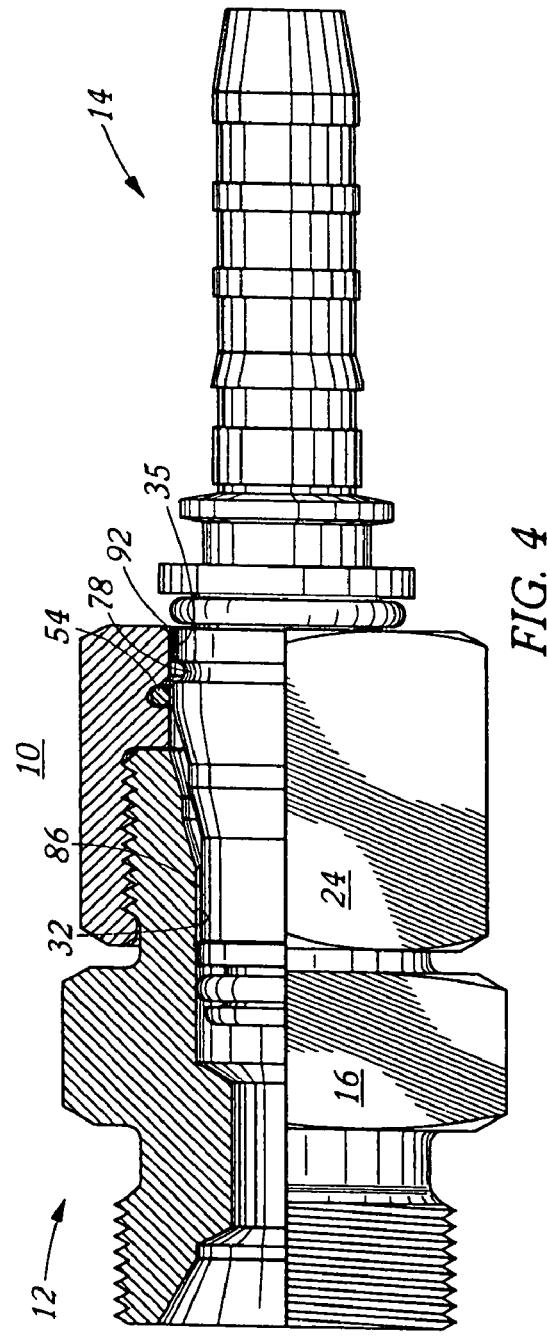
FIG. 4 is an elevation with one quarter cut-away of a port for a preferred embodiment as connection of the coupling further progresses.

Referring to FIGS. 1 through 5, one preferred embodiment of this quick connect coupling 10 invention includes body assembly or fixture portion 12 and hose stem 14. They are illustrated in FIG. 1 prior to the insertion of hose stem 14 into body assembly 12. The body assembly 12 includes adapter 16 having fixture connection portion 68 formed with central wrenching section 18 and fixture end 20 which has external threads for mounting body assembly 12 onto associated fixtures, machinery or equipment. It should be understood that although adapter 16 is illustrated as having external threads at fixture end 20, other types of end connections can be utilized. These include internal threads at fixture end 20, or adapter 16 being formed integral to the associated fixture or equipment. Further, adapter 16 and nut 24 can be a unitary structure with no need for threads intermediate thereto. Port 64 would then be formed within this unitary structure. Further still, port 64 can be formed integral to associated fixtures, machinery or equipment.

Joinder end 22 of adapter 16 is also externally threaded to receive nut 24. For this embodiment, nut 24 is normally threaded onto adapter 16 with proper torque prior to installation of body assembly 12 on an associated fixture, machine or equipment. Adapter abutment 72 of adapter 16 abuts nut abutment 74 of nut 24 when nut 24 is properly positioned with respect to adapter 16 and applied with proper torque. Nut 24 is provided with forward end face 26. Face 26 remains spaced from wall 28 on adapter 16. However, the abutting relationship can be arranged to be between face 26 and wall 28, upon application of proper torque.

Adapter 16, in cooperation with nut 24, provides a port 64 including a forward cylinder 32, a first intermediate cylinder 33 (formed in adapter 16 in the instant embodiment), a second intermediate cylinder 34, and a rear cylinder 35 (formed in nut 24 in the instant embodiment).

Port 64 further includes second transition ramp 46, between forward cylinder 32 and first intermediate cylinder 33, and first transition ramp 47 between first intermediate cylinder 33 and second intermediate cylinder 34. Both ramps 46 and 47 are formed in adapter 16 for the instant embodiment, but may be formed in a unitary body assembly 12 or directly in the associated fixture, machinery or equipment.

Beyond forward cylinder 32 is adapter bore 36 which preferably has a diameter at least substantially equal to the inside diameter of hose stem bore (not depicted).

Nut 24 has an interior annular groove 48 forward spaced from rear cylinder 35. Interior annular groove 48 is preferably formed with a substantially radial interior forward face 50 and interior rearward face 52. The rearward face 52 terminates in locking chamfer 53, which functions as discussed below. Alignment chamfer 45 is contiguous with rear cylinder 35. Positioned within interior annular groove 48 of nut 24 is clip 54 in the form of an expandable lock ring or snap ring of common shape. It is contemplated that other clip shapes could be employed. Nut 24 has wrenching flats 56 so that nut 24 may be threaded onto and off of adapter 16.

Still referring to FIG. 1, hose stem 14 includes male connection portion 66 and hose insert portion 58. Progressing from most rearward position to most forward position, male connection portion 66 includes, rear o-ring groove 82 in which resides second o-ring seal 80, following support cylindrical surface 92, locking groove 78 for receiving clip 54 upon final assembly of coupling 10, including exterior forward face 79, second intermediate support cylinder 90, transition surface or camming ramp 77, first intermediate support cylindrical surface 88, centering ramp 76, leading support cylindrical surface 86, forward seal groove 70 in which resides o-ring backing 44 and the sealing element, first o-ring seal 42, and annular lead-in surface 94.

Annular lead-in surface 94 can be substantially cylindrical with an outer radius smaller than the outer radius of leading support cylindrical surface 86, as depicted, or frustoconical. Outer radius of leading support cylindrical surface 86 is smaller than outer radius of first intermediate support cylindrical surface 88, which is smaller than second intermediate support cylinder 90. The progressively larger radii of the various surfaces, including those that may be frustoconical, along with specific axial dimensional relationships, provide the guiding function that overcomes substantial axial and lateral misalignment of hose stem 14 in relation to body assembly 12 in the initial phase of joinder. These relationships also serve to minimize peak insertion force and the incidence of clip 54 clogging port 64 to interfere with connection. These relationships and their affects will be fully described in the specific description of the events and interactions which occur during connection, infra.

O-ring backing 44 is provided to increase the pressure to which coupling 10 can be subjected before fluid begins to by-pass first o-ring 42 and coupling 10 begins to leak. Construction of o-ring backing 44 varies depending upon the fluid pressure of the associated application of coupling 10 and is well know in the art. Hose stem 14 also includes hose insert portion 58 which extends inwardly, to an associated hose, from hose stop 60 and is adapted to fit snugly with the connection end of a hose (not depicted). Hose insert portion 58 includes barbs 62 to facilitate increased resistance to separation of hose stem 14 from the associated hose. Commonly, a ferrule (not depicted) is crimped about the end of the hose in which hose insert portion 58 extends and about hose stop 60 to increase the resistance to separation of hose stem 14 from the hose.

Figure 5:
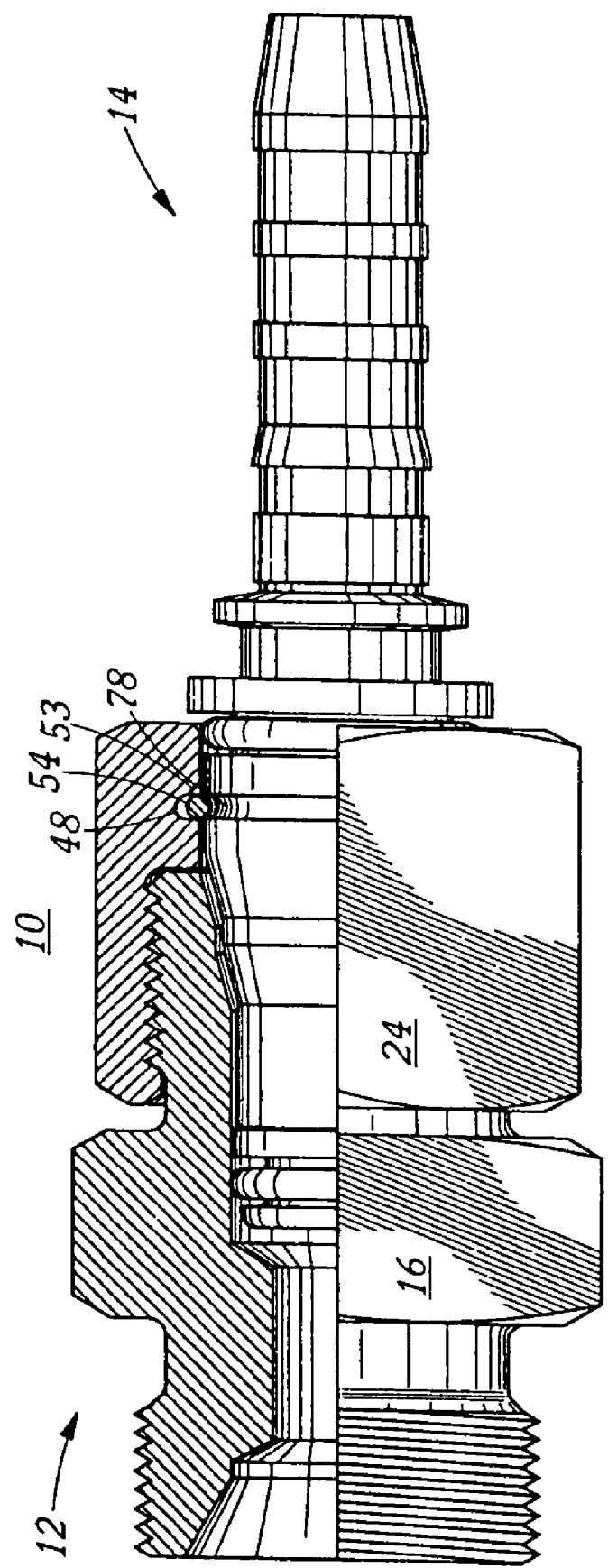
FIG. 5 is an elevation with one quarter cut-away of a port for a preferred embodiment upon connection of the coupling.

The connection of coupling 10 is depicted progressively in FIG. 2. through FIG. 5, respectively. Initially all items of body assembly 12 are assembled including nut 24 threaded upon adapter 16 with proper torque. Clip 54 is placed within interior annular groove 48. Body assembly 12 is then affixed upon the associated fixture, machinery or equipment with proper torque. If body assembly 12 is a unitary structure, assembly would not be necessary. It would only be necessary for clip 54 to be placed within interior annular groove 48, and body assembly 12 to be affixed upon the associated fixture, machinery or equipment with proper torque. Further, if port 64 is formed integral to the associated fixture, machinery or equipment, it is only be necessary for clip 54 to be placed within interior annular groove 48.

Generally, connection of coupling 10 is effected by hose stem 14 being pressed into body assembly 12 until reaching locking engagement as depicted in FIG. 5. Male connection portion 66 of hose stem 14 extends through alignment chamfer 45 and rear cylinder 35 and into forward cylinder 32 of port 64 with a close fit. The various proportions are arranged so that first o-ring seal 42 has an unstressed outside diameter less than the inside diameter of forward cylinder 32 so that the movement of male connection portion 66 to the assembled position of FIG. 5 causes radial compression of first o-ring seal 42. In such condition first o-ring seal 42 provides a fluid tight joint between the male connection portion 66 and port 64.

During such assembly camming ramp 77 engages clip 54 and radially expands clip 54 from its unstressed condition out into the interior annular groove 48. During such movement clip 54 is urged forward by camming ramp 77 and engages interior forward face 50. Because interior forward face 50 is radial, clip 54 can expand easily as camming ramp 77 is moved into the assembled position.

As male connection portion 66 is moved into the fully assembled position locking groove 78 moves to a position under clip 54 so that clip 54 is allowed to snap into a position in which it bridges between the interior annular groove 48 and locking groove 78. In such bridging position, hose stem 14 is permanently mechanically locked in position within port 64 via nut 24.

Clip 54 is formed with an unstressed radius sized so that its outer periphery has a radius greater than the radius of the inner extremities of faces 50 and 52 of interior annular groove 48 and its inner periphery has a radius less than the radius second intermediate support cylinder 90. Consequently, clip 54 is trapped within interior annular groove 48 of nut 24 prior to assembly, but snaps into locking groove 78 upon assembly of hose stem 14 within the body assembly 12. Locking chamfer 53 ensures this locking configuration by having an angle in relation to exterior forward face 79 such that their cooperation tends to force clip 54 into locking groove 78 when force is applied tending to separate hose stem 14 from port 64. Clip 54 will tend to rest, under pressure tending to separate hose stem 14 from port 64, at the point within locking groove 78 having a tangent having the same angle in relation to the axis of port 64 as the angle of locking 53 in relation to the axis of port 64. Accordingly, exterior forward face 79 will have a tangent at some point on its arc with an angle in relation to the axis of port 64 greater than the angle of locking chamfer 53 in relation to the axis of port 64.

To insure this locking action, the maximum radius of second intermediate support cylinder 90 is selected to be less than the radius of rear cylinder 35 by an amount less than the diameter of the wire forming clip 54. With such structure, a positive mechanical locking of male connection portion 66 within port 64 is provided.

In order to allow clip 54 to expand as camming ramp 77 is pressed into the assembled position, the depth of the interior annular groove 48 is proportioned to be at least as great as the diameter of the wire forming clip 54.

In the depicted embodiment, body assembly 12 is installed on the associated fixture, machinery or equipment with nut 24 and clip 54 each properly in position. Completion of the assembly is accomplished thereafter by merely pressing hose stem 14 into body assembly 12 to its assembled position in which it is permanently locked within nut 24 by operation of clip 54.

Specifically, during connection a number of events and interactions occur which ensure that: 1) the required insertion force of the coupling is low; 2) the required insertion force is consistent among sibling couplings; 3) the coupling is axially self-aligning; 4) the coupling is highly resistant to binding upon misaligned insertion of hose stem 14 into port 64; 5) the coupling is self guiding to overcome substantial lateral misalignment when the process of connection is first begun; and, 6) the coupling being highly resistive to binding upon misalignment of stem in relation to the clip upon insertion of the stem into the port.

As stem 14 is inserted in port 64 many events occur to cause coupling 10 to axially self align. Some are sequential. Others are simultaneous. Annular lead-in surface 94 is repeatedly guided toward the center of port 64. Assuming connection is being made with maximum lateral and axial misalignment, annular lead-in surface 94 first encounters alignment chamfer 45 to guide it to adequate alignment with rear cylinder 35, clip 54 and second intermediate cylinder 34. Annular lead-in surface 94 then encounters first transition ramp 47 to align it with first intermediate cylinder 33. Finally, annular lead-in surface 94 encounters second transition ramp 46 to align it with forward cylinder 32. At this point, centering ramp 76 encounters alignment chamfer 45, forcing stem 14 to begin axial alignment with port 64. Not only does this provide this first level of forcing axial alignment, it also protects clip 54 from interacting with stem 14 too early in the connection process, which would allow movement of clip 54 out of interior annular groove 48 and the beginning of clip 54 clogging port 64. Next, three events occur in a most important combination to give rise to all the described important characteristics, except for ensuring that the required insertion force of the coupling is low. One, camming ramp 77 encounters alignment chamfer 45. This further forces stem 14 into almost perfect axial alignment with port 64. Two, clip 54 is being coaxed back into interior annular groove 48 by centering ramp 76. Three, the forward edge of leading support cylindrical surface 86 encounters second transition ramp 46 to further confine the lateral alignment of stem 14 within port 64. It is these three events operating in concert that prevents stem 14 from exerting such force upon clip 54 as to snag one portion of clip 54 and force it out of interior annular groove 48 at an angle down inside port 64. Now stem 14 is in nearly perfect alignment with port 64. Accordingly, there is nothing to do but press stem 14 the remaining distance into port 64 to the point of clip 54 seating into locking groove 78. This places coupling 10 into the locking engagement described earlier.

It can be seen that these processes ensure that stem 14 will become axially and laterally aligned with port 64 even in difficult environments. This satisfies the third and fifth of the enumerated important characteristics. The described three events occurring in combination ensure that clip 54 is not moved into a position that would clog port 64. This prevents the coupling from binding upon misaligned of stem in relation to the clip during insertion of hose stem 14 into port 64. This satisfies characteristic six. The progressive nature of axial alignment ensures that the coupling connects smoothly and is thus highly resistant to binding upon misaligned insertion of hose stem 14 into port 64. This satisfies characteristic four. The smooth nature of the connection process and the reliable movement of clip 54 into proper position leads to a coupling that is tolerant of ordinary excursions of dimensions found in normal manufacturing processes. This allows the required insertion force is consistent among sibling couplings. This satisfies characteristic two.

Finally, satisfaction of characteristic one is facilitated by the self aligning characteristic of the instant invention, by reducing the opportunity for various interactions of members of port 64 with members of stem 14 to affect insertion force. This leads to insertion force being primarily the result of the interaction of first o-ring seal 42 with second transition ramp 46 to compress first o-ring seal 42 and slide it along the surface of second transition ramp 46, seal interaction, and the interaction of clip 54 with camming ramp 77 to expand clip 54 and slide it along the surface of camming ramp 77, clip interaction.

The distance over the port between the point where first o-ring seal 42 first contacts second transition ramp 46 and the point where camming ramp 77 first contacts snap ring 54, upon insertion of hose stem is herein referred to as the port peak distance. The distance over the male connection portion 66 of stem 14 between the point where first o-ring seal 42 first contacts second transition ramp 46 and the point where camming ramp 77 first contacts snap ring 54, upon insertion of hose stem is herein referred to as the stem peak distance. Specific to this embodiment, port peak distance is less than stem peak distance by an amount that separates the times when seal interaction and clip interaction occur. This eliminates the additive affect upon the required insertion force caused by seal interaction occurring simultaneously with clip interaction. This does not reduce the overall amount of energy required to effect the connection. However, it does reduce the peak force required to the greater of either the force requirement caused by seal interaction or the force requirement of clip interaction. This can mean the difference between successfully completing connection in an unfriendly environment or having a connection that simply cannot be completed. Even more significantly it can prevent the partially completed connection which can later disconnect with disastrous results.

Hose stem 14 is preferably provided with debris barrier 84 which is aligned with the end of nut 24 when hose stem 14 is in the assembled position. Such structure provides a visual indication that the hose end has been pushed into the body assembly a sufficient amount to cause first o-ring seal 42 and clip 54 to be adequately engaged. Further, debris barrier 84 acts as a forward stop for the ferrule and blocks certain debris from entering body assembly 12. The reduction of the entrance of debris is greatly enhanced by the presence of second o-ring seal 80 at rearward o-ring groove 82. Second o-ring seal 80 seals the gap that would otherwise exist at the interface between following support cylindrical surface 92 and rear cylinder 35 upon joinder of hose stem 14 with body assembly 12.

With this embodiment it is possible to remove hose stem 14 from adapter 16 by threading nut 24 off of adapter 16 and to reinstall hose stem 14 by threading nut 24 back onto adapter 16. Thus, the depicted embodiment can be assembled and disassembled without removal of adapter 16 from the associated fixture, machinery or equipment. However, during the first assembly, hose stem 14 is installed by merely pressing it into adapter 16. As stated earlier, Port 64 can also be formed into body assembly 12 with all of the elements of adapter 16 and nut 24 except for threads intermediate thereto. In such configuration, removal and reconnection of hose stem 14 entails unthreading and rethreading body assembly 12 upon the associated fixture, machinery or equipment, respectively. Also as stated earlier, port 64 can be formed directly into the associated fixture, machinery or equipment. When so formed, disconnection is not allowed.

It should be noted that there is freedom for relative rotation between the hose end assemblies and the body assemblies of all embodiments. Such relative rotation permits nut 24, or body assembly 12 as the case may be, to be rotated for disassembly of quick coupling 10 without corresponding rotation of the associated hose. Similarly, the hose may be rotated relative to body assembly 12 when required for installation in confined locations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A quick connect coupling comprising:
    a clip;
    a port having an interior cylindrical bore, said port further comprising:
        an interior annular groove adapted to support said clip;
        a forward cylinder;
        a rear cylinder;
        a first transition ramp;
        a port peak distance;
        a first intermediate cylinder intermediate to said forward cylinder and a second intermediate cylinder, said second intermediate cylinder intermediate to said first intermediate cylinder and to said rear cylinder, said first transition ramp extending from said first intermediate cylinder to said second intermediate cylinder; and
        a second transition ramp extending from said forward cylinder to said first intermediate cylinder;
        a ramp connecting the cylindrical bore to the forward cylinder;
    a sealing element; and
    a stem having an interior bore and a male connection portion comprising:
        a forward annular seal groove adapted to receive said sealing element;
        an annular lead-in surface;
        a leading support cylindrical surface;
        a following support cylindrical surface;
        a camming ramp;
        a stern peak distance;
        a centering ramp; and
        an intermediate support cylindrical surface intermediate to said leading support cylindrical surface and said following support cylindrical surface.

2. The quick connect coupling of claim 1 wherein said port peak distance is unequal to said stem peak distance.

3. The quick connect coupling of claim 1 wherein said port is unitary.

4. The quick connect coupling of claim 3 wherein the unitary port is defined in a structure.

5. The quick connect coupling of claim 3 wherein the unitary port is defined by a unitary one-piece fitting.

* * * * *